United States Patent [19]
Ueki et al.

[11] Patent Number: 5,097,366
[45] Date of Patent: Mar. 17, 1992

[54] SMALL-SIZE MAGNETIC DISK DRIVE MECHANISM WITH HERMETICALLY SEALED CHAMBER

[75] Inventors: Yashiro Ueki; Tatsuya Miki, both of Kanagawa, Japan

[73] Assignee: Victor Company of Japan, Ltd., Japan

[21] Appl. No.: 544,534

[22] Filed: Jun. 28, 1990

[30] Foreign Application Priority Data

Jun. 30, 1989 [JP] Japan .................. 1-78031[U]

[51] Int. Cl.⁵ ............................................. G11B 5/012
[52] U.S. Cl. ................................................. 360/97.02
[58] Field of Search ............... 360/97.02, 97.03, 97.04, 360/137, 98.01, 99.01

[56] References Cited

U.S. PATENT DOCUMENTS

| | | | |
|---|---|---|---|
| 4,894,739 | 1/1990 | Kobayashi | 360/97.02 |
| 4,908,715 | 3/1990 | Krum et al. | 360/97.02 |
| 4,979,062 | 12/1990 | Stefansky et al. | 360/97.02 |
| 4,999,724 | 3/1991 | McAllister et al. | 360/97.03 X |
| 5,001,581 | 3/1991 | Elsasser et al. | 360/97.02 |

*Primary Examiner*—John H. Wolff
*Attorney, Agent, or Firm*—Lowe, Price, LeBlanc & Becker

[57] ABSTRACT

A magnetic disk drive mechanism has a magnetic disk, a magnetic disk drive motor for rotating the magnetic disk, a magnetic head for recording and reproducing information on and from the magnetic disk, and a chassis defining a hermetically sealed chamber which houses the magnetic disk, the magnetic disk drive motor, and the magnetic head therein. Printed wire patterns are disposed on a surface of a flat stator base of the motor which faces into the hermetically sealed chamber, the printed wire patterns having terminals extending out of the hermetically sealed chamber. An O-ring is interposed between the chassis and the stator base, for hermetically sealing the terminals from the hermetically sealed chamber.

10 Claims, 3 Drawing Sheets

SMALL-SIZE MAGNETIC DISK DRIVE MECHANISM WITH HERMETICALLY SEALED CHAMBER

BACKGROUND OF THE INVENTION

The present invention relates to a magnetic disk drive mechanism, and more particularly to a magnetic disk drive mechanism which includes a magnetic disk drive motor whose stator base is part of a chassis of the magnetic disk drive mechanism.

Magnetic disk drive mechanisms are widely used in magnetic information storage devices for computers and information processing systems.

The magnetic disk drive mechanisms include magnetic disk drive motors for rotating magnetic disks. A magnetic disk drive motor for a small-size magnetic disk drive mechanism which rotates a 3.5-inch magnetic disk is small in size and usually housed within a hub which holds the central hole in the magnetic disk. The magnetic disk drive motor of this type is known as the in-hub magnetic disk drive motor.

One conventional magnetic disk drive mechanism includes a box-shaped chassis which defines a hermetically sealed chamber therein. The hermetically sealed chamber houses therein a magnetic disk and an in-hub magnetic disk drive motor for rotating the magnetic disk. The in-hub magnetic disk motor includes a stator base fastened to the chassis and a printed-circuit baseboard mounted on the stator base, the printed-circuit baseboard including printed coil patterns for frequency and pulse generators for detecting the rotational speed and phase of the motor. The stator base and the printed-circuit baseboard are of a double-layer construction, which makes the magnetic disk drive mechanism relatively thick. The printed coil patterns are soldered to lead wires within the hermetically sealed chamber, and special care should be taken to prevent dust particles from being scattered from the soldered terminals into the hermetically sealed chamber. It is also difficult to reliably seal the lead wires which extend from the hermetically sealed chamber through a hole defined in the stator base of the motor because the hole cannot easily be filled up with a resin adhesive.

SUMMARY OF THE INVENTION

It is an object of the present invention to provide a highly reliable magnetic disk drive mechanism which is low in profile, has few soldered terminals located in a hermetically sealed chamber, and also has lead wires easily sealed from the hermetically sealed chamber.

According to the present invention, there is provided a magnetic disk drive mechanism comprising a magnetic disk, a magnetic disk drive motor for rotating the magnetic disk, a magnetic head for recording and reproducing information on and from the magnetic disk, and a chassis defining a hermetically sealed chamber with a hole in the chassis being hermetically closed by a flat stator base of the magnetic disk drive motor. The hermetically sealed chamber accommodates the magnetic disk, the magnetic disk drive motor, and the magnetic head therein. Printed wire patterns are disposed on a surface of the flat stator base which faces into the hermetically sealed chamber, the printed wire patterns having terminals extending out of the hermetically sealed chamber. An O-ring is interposed between the chassis and the stator base, for hermetically sealing the terminals from the hermetically sealed chamber. The O-ring is of substantially the same as the outer profile of a form the rotor of the magnetic disk drive motor, and extends across the printed wire patterns. The flat stator base comprises a printed-circuit baseboard which is made of iron, the printed wire patterns being mounted on the printed-circuit baseboard. The magnetic disk drive mechanism also includes a wire assembly soldered at one end thereof to the terminals, and a presser resiliently pressed between the terminals and the chassis.

The flat stator base is in the form of a printed-circuit baseboard of iron with the printed wire patterns thereon, so that the magnetic disk drive motor and hence the entire magnetic disk drive mechanism are low in profile. Because the terminals of the printed wire patterns are located out of the hermetically sealed chamber, no dust particles enter the hermetically sealed chamber from the soldered terminals. The printed wire patterns with their terminals outside of the hermetically sealed chamber are simply sealed by the 0-ring.

The above and other objects, features and advantages of the present invention will become more apparent from the following description when taken in conjunction with the accompanying drawings in which a preferred embodiment of the present invention is shown by way of illustrative example.

DETAILED DESCRIPTION

Figure 1:
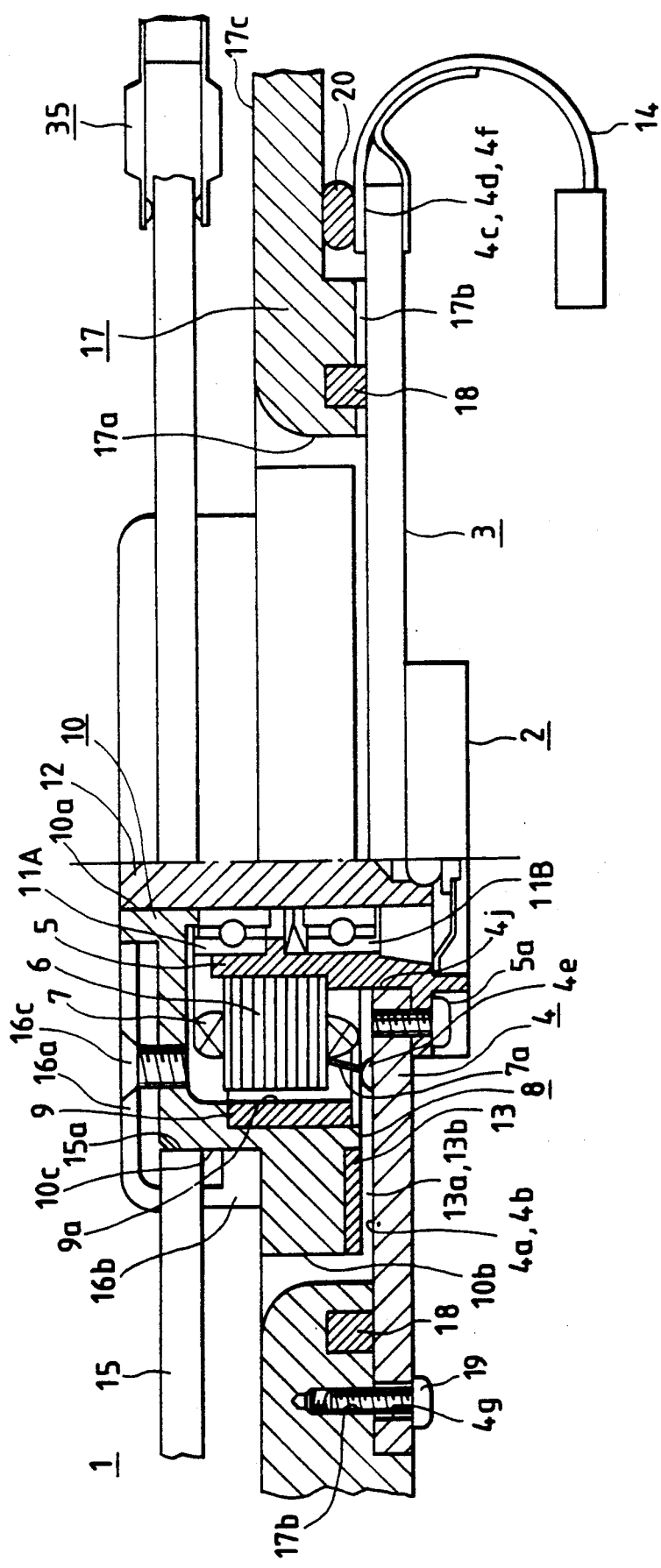
FIG. 1 is a fragmentary cross-sectional view, partly in elevation, of a magnetic disk drive mechanism according to the present invention.
Figure 2:
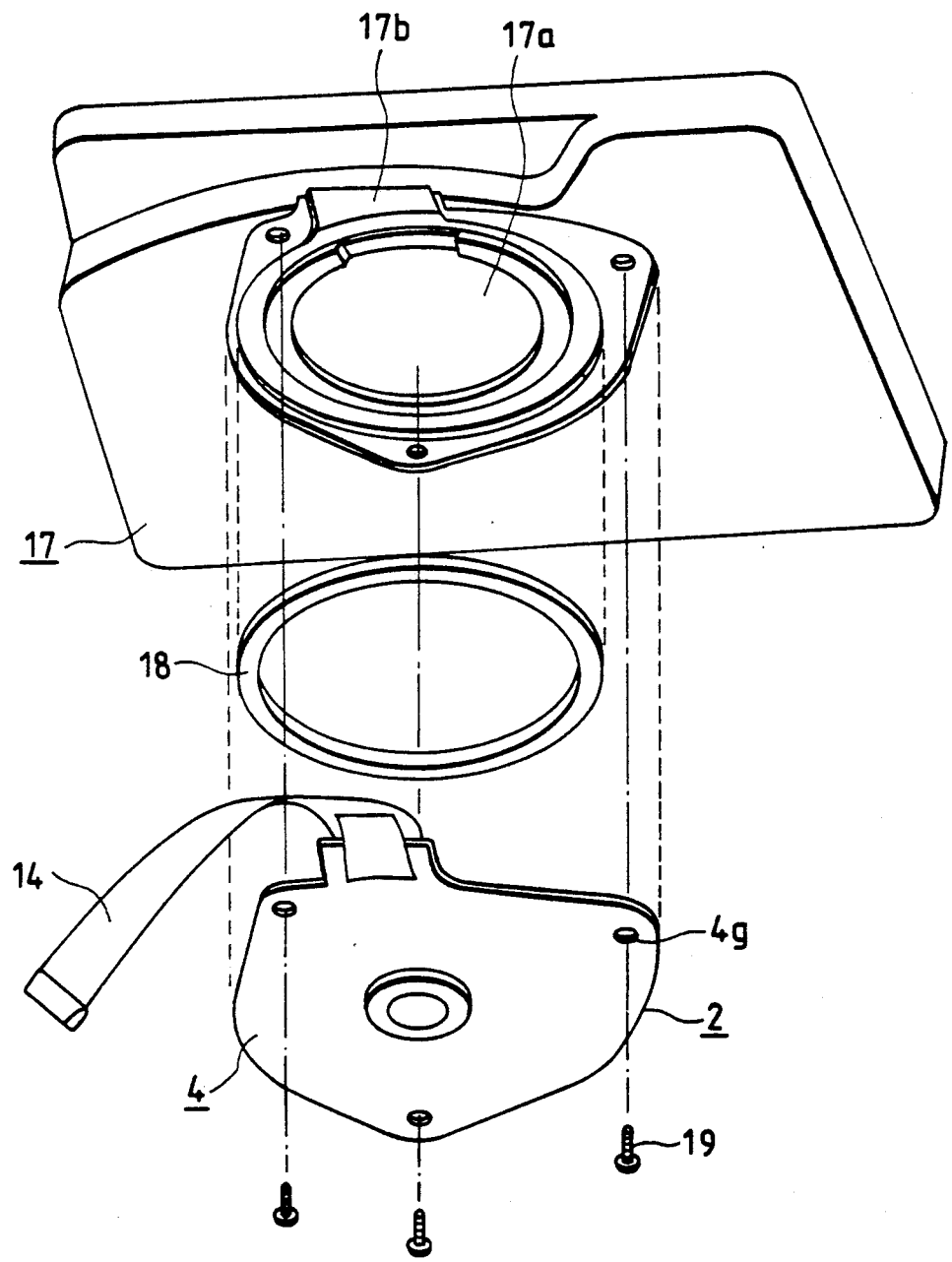
FIG. 2 is an exploded perspective view of a chassis, an O-ring, and a stator base of the magnetic disk drive mechanism shown in FIG. 1.

FIG. 1 fragmentarily shows a magnetic disk drive mechanism according to the present invention. The magnetic disk drive mechanism, generally designated by the reference numeral 1, essentially comprises a magnetic disk drive motor 2 in the form of an in-hub brushless motor, a chassis 17, a magnetic head 35. The magnetic disk drive motor 2 comprises a stator 3 and a rotor 8.

The terms "upper", "lower", "inner", "outer", and any other similar directional expressions are used herein with respect to the geometrical configuration of the magnetic disk drive mechanism shown in FIG. 1.

The stator 3 has a flat stator base 4 which comprises a printed-circuit baseboard of iron having a thickness of 1.2 mm and copper-foil wire patterns printed on the baseboard with an insulating layer therebetween. The stator base 4 has a central hole 4j defined therein which receives a hollow bearing holder 5 which is die-cast of aluminum and fixed to the stator base 4 by a screw 5a. The stator 3 also has a laminated iron core 6 disposed around and fixed to the bearing holder 5, and three-phase drive coils 7 wound around the laminated iron core 6.

The rotor 8 has a tubular drive magnet 9 disposed around the laminated iron core 6 with a gap therebetween, the tubular drive magnet 9 having eight circumferentially spaced drive magnetic poles 9a on its inner circumferential surface. The rotor 8 also has a cup-shaped rotor case 10 of iron in which the tubular drive magnet 9 is received such that the outer circumferential surface of the tubular drive magnet 9 is fixedly held against the inner circumferential surface of the rotor case 10. The rotor case 10, which is preferably formed by cold forging and machining processes, also serves as a magnetic path for the drive magnet 9 and as a magnetic shield for preventing leakage fluxes. The rotor case 10 has a central hole 10a defined in one end thereof which is spaced from the stator base 4. The rotor 8 also includes a rotatable shaft 12 extending coaxially through and rotatably supported in the bearing holder 5 by upper and lower ball bearings 11A, 11B whose outer races are held by the inner circumferential surface of the bearing holder 5. The rotatable shaft 12 has an upper end fixedly mounted in the central hole 10a in the rotor case 10.

The stator 3 and the rotor 8 incorporate a frequency generator for detecting the rotational speed of the rotor 8 and a pulse generator for detecting the phase of angular displacement of the rotor 8.

More specifically, the rotor case 10 has an integral flange 10b around an open end thereof near the stator base 4. The frequency and pulse generators have a circular magnet 13 fixed to the lower surface of the flange 10b in face-to-face confronting relation to the upper surface of the stator base 4 with a small gap or clearance created therebetween. The flange 10b, which serves as a base supporting the magnet 13, also serves as a magnetic path for the magnet 13 and as a magnetic shield for preventing leakage fluxes. The magnet 13 has, on its lower surface, a ring-shaped pattern of ninety-six magnetic poles 13a. The stator base 4 has, on its upper surface, a printed ring-shaped coil 4a (see FIG. 3) facing the magnetic poles 13a. The coil 4a comprises comb-shaped turns spaced at the same pitch as that of the magnetic poles 13a. The magnetic poles 13a and the coil 4a jointly constitute the frequency generator. The magnet 13 also has, on its lower surface, a single magnetic pole 13b (FIG. 1) on its circumference. The stator base 4 has a coil 4b (FIG. 3) printed on the upper surface thereof, the coil 4b comprising a single turn. The coil 4b is positioned such that it faces the single magnetic pole 13b once during one revolution of the rotor 8. The magnetic pole 13b and the coil 4b jointly constitute the pulse generator. The coils 4a, 4b are formed by some of the copper-foil patterns on the iron baseboard of the stator base 4. The baseboard of the stator base 4 serves as a magnetic path for the frequency and pulse generators and a magnetic shield for preventing leakage fluxes.

Three lead wires 7a extend from the three-phase drive coils 7, respectively, and are soldered to corresponding lands 4e on radially inner ends of three substantially parallel printed wire patterns 4h on the stator base 4. The three printed wire patterns 4h have respective terminals 4f on radially outer ends thereof which are positioned on a radially outwardly projecting tongue 4i of the stator base 4. The coil 4a has two terminals 4c and the coil 4b also has two terminals 4d, these terminals 4c, 4b being also positioned on the tongue 4i in juxtaposed relation to the terminals 4f. A wire assembly 14 (FIG. 1) in the form of a flexible printed-circuit baseboard with wire patterns printed thereon is soldered at one end thereof to the terminals 4c, 4d, 4f with heat and pressure.

The chassis 17 has a motor attachment hole 17a defined therein. The magnetic disk drive motor 2 is placed in the motor attachment hole 17a with the stator base 4 held against the lower surface of the chassis 17, closing the motor attachment hole 17a. The magnetic disk drive motor 2 is fastened to the chassis 17 by means of a screw 19 which is threaded through a hole 4g defined in the stator base 4 and into a threaded hole 17b defined in the lower surface of the chassis 17.

The magnetic disk 15 has a central hole 15a defined therein and fitted over a hub 10c of the rotor case 10, which is positioned upwardly of the flange 10b. The magnetic disk 15 is securely clamped to the hub 10c by clamp elements 16a, 16b, 16c. While the single magnetic disk 15 is employed so that the magnetic disk drive mechanism 1 is relatively low in profile, the magnetic disk drive mechanism 1 may be modified so that two magnetic disks may be mounted on the hub.

Figure 3:
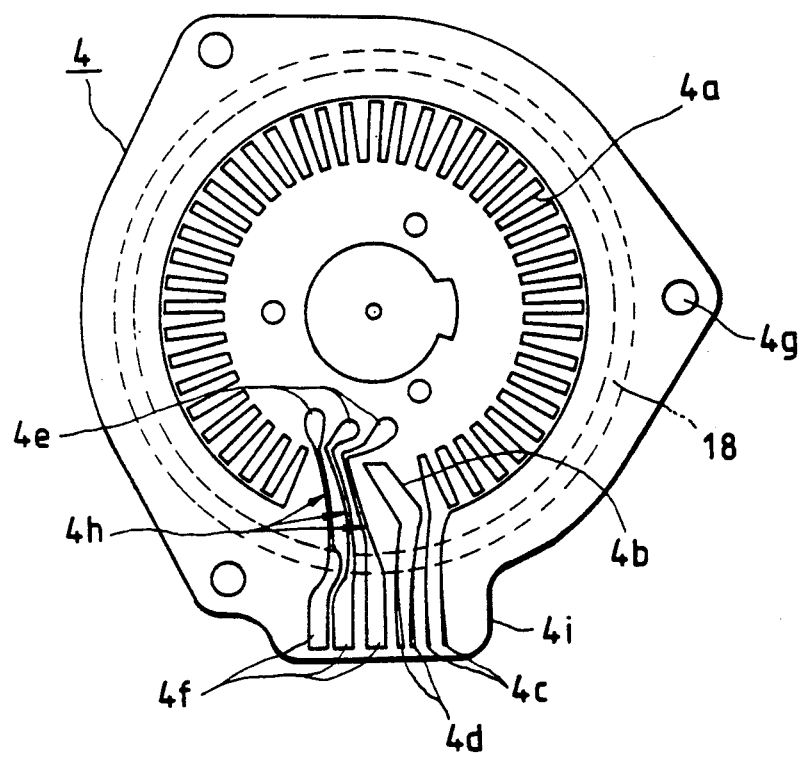
FIG. 3 is a plan view of the stator base shown in FIG. 2.

The chassis 17 is substantially box-shaped, defining a hermetically sealed chamber 17c therein, together with the fastened stator 3, for protecting the magnetic disk 15 from dust and other foreign matter. The magnetic disk drive motor 2 and the magnetic disk 15 are accommodated in the hermetically sealed chamber 17c. To keep chamber 17c hermetically sealed, the stator base 4 is fixed to the chassis 17 through an O-ring 18 of rubber interposed therebetween. The O-ring 18 is of a shape which is of substantially the same as the outer profile of the rotor 8. As shown in FIG. 3, the O-ring 18 is positioned with respect to the stator base 4 such that the O-ring 18 extends across the printed wire patterns of the coils 4a, 4b leading to the terminals 4c, 4d, and the printed wire patterns 4h between the lands 4e and the terminals 4f. The O-ring 18 pressed against the stator base 4 effectively keeps the chamber 17c hermetically sealed from the exterior. In addition, the terminals 4c, 4d, 4f which are soldered to the wire assembly 14 are located out of the hermetically sealed chamber 17c by the O-ring 18. The chassis 17 has a clearance 17b defined in a lower surface thereof where the O-ring 18 crosses the printed wire patterns, so that the printed wire patterns are held out of electric contact with the chassis 17.

The end of the wire assembly 14 which is soldered to the terminals 4c, 4d, 4f is pressed against the upper surface of the stator base 4 by a rubber presser 20 which is resiliently placed between the lower surface of the chassis 17 and the end of the wire assembly 14. Accordingly, the wire assembly 14 is firmly anchored to the stator base 4 for increased mechanical strength against forced removal. The wire assembly 14 is electrically connected to a brushless motor driver and a constant-speed and constant-phase control circuit (not shown).

The brushless motor driver and the constant-speed and constant-phase control circuit operate to switchingly supply drive currents to the three-phase drive coils 7, and control the drive currents based on detected signals from the frequency and pulse generators so that the rotor 8 and hence the magnetic disk 15 rotate at a constant speed with a constant phase. While the magnetic disk 15 is rotating, desired information is recorded in or read from a desired track on the magnetic disk 15 by the magnetic head 35.

A magnetoelectric transducer such as a Hall-effect device for detecting the position of the drive magnetic poles 9a is omitted from illustration. Actually, however, such a magnetoelectric transducer is employed, and a printed wire pattern led from the magnetoelectric transducer is added to the printed wire patterns which lead to the terminals 4c, 4d, 4f on the stator base 4.

Since the stator base 4 in the form of a printed-circuit baseboard of iron with printed wire patterns thereon is employed, the magnetic disk drive motor 2 and hence the entire magnetic disk drive mechanism 1 are lower in profile than would be if the double-layer construction of a stator base and a coil baseboard, separate therefrom but fixed thereto, were employed. Because the terminals 4c, 4d, 4f soldered to the wire assembly 14 are located out of the hermetically sealed chamber 17c, it is not necessary to take special measures to prevent dust particles from entering the chamber 17c from the soldered terminals. The printed wire patterns which lead to the terminals 4c, 4d, 4d outside of the hermetically sealed chamber 17c are simply sealed by the O-ring 18. As a consequence, the magnetic disk drive mechanism 1 is highly reliable, structurally simple, and inexpensive to manufacture.

Although a certain preferred embodiment has been shown and described, it should be understood that many changes and modifications may be made therein without departing from the scope of the appended claims.

What is claimed is:

1. A magnetic disk drive mechanism comprising:
   a magnetic disk;
   a magnetic disk drive motor for rotating said magnetic disk, said magnetic disk drive motor including a stator having drive coils and a flat stator base and a rotor rotatable with respect to said stator, said flat stator base having printed wire patterns which are connected to said drive coils;
   a magnetic head for recording and reproducing information on and from said magnetic disk;
   a chassis having a hole, said channels defining a hermetically sealed chamber with said hole hermetically closed by said flat stator base, said hermetically sealed chamber accommodating said magnetic disk, said magnetic disk drive motor, and said magnetic head therein, said printed wire patterns being disposed on a surface of said flat stator base which faces into said hermetically sealed chamber, said printed wire patterns comprising first terminals to which said drive coils are connected in said hermetically sealed chamber and portions extending out of said hermetically sealed chamber and ending in second terminals which remain outside; and
   seal means, interposed between said channels and said flat stator base and extending around said rotor, for sealing said hermetically sealed chamber from said second terminals.

2. A magnetic disk drive mechanism according to claim 1, wherein said seal means comprises an O-ring which is formed to have a profile which is substantially the same as the outer profile of said rotor.

3. A magnetic disk drive mechanism according to claim 2, wherein said O-ring extends across said printed wire patterns.

4. A magnetic disk drive mechanism according to claim 1, wherein said flat stator base comprises a printed-circuit baseboard which is made of iron, said printed wire patterns being mounted on said printed-circuit baseboard.

5. A magnetic disk drive mechanism according to claim 1, wherein said flat stator base is fastened to a surface of said chassis which is remote from said hermetically sealed chamber.

6. A magnetic disk drive mechanism according to claim 1, wherein said chassis has a clearance defined in a lower surface thereof where said seal means crosses over said printed wire patterns, and said wire patterns lie in said clearance out of electric contact with said chassis.

7. A magnetic disk drive mechanism according to claim 1, further including a wire assembly soldered at one end thereof to said terminals, and a presser resiliently pressed between said terminals and said chassis.

8. A magnetic disk drive mechanism according to claim 1, further including a frequency generator for detecting the rotational speed of said rotor and a pulse generator for detecting the phase of angular displacement of said rotor, said frequency generator and said pulse generator being mounted on said stator base and said rotor.

9. A magnetic disk drive mechanism according to claim 1, wherein said printed wire patterns include electrically conductive means, disposed on and along said surface of said flat stator base, for electrically connecting at least one of said first terminals and at least one of said second terminals to each other.

10. A magnetic disk drive mechanism comprising:
    a magnetic disk;
    a magnetic disk drive motor for rotating said magnetic disk, said magnetic disk drive motor including a stator having drive coils and a stator base and a rotor rotatable with respect to said stator, said rotor including a rotatable shaft rotatably supported by said stator base, said stator base having printed wire patterns which are connected to said drive coils and disposed in confronting relationship to said rotor in an area radially outward of said rotatable shaft;
    a magnetic head for recording and reproducing information on and from said magnetic disk; and
    a chassis having a hole, said chassis defining a hermetically sealed chamber with said hole hermetically closed by said stator base, said hermetically sealed chamber accommodating said magnetic disk, said magnetic disk drive motor, and said magnetic head therein, said printed wire patterns including terminals to which said drive coils are connected in said hermetically sealed chamber, terminal means positioned outside of said hermetically sealed chamber, and electrically conductive means extending on and along said stator base and between said rotor and said stator, said electrically conductive means having ends connected to said terminals in said hermetically sealed chamber and opposite ends connected to said terminal means.

* * * * *